(12) United States Patent
Bowen et al.

(10) Patent No.: US 6,203,631 B1
(45) Date of Patent: *Mar. 20, 2001

(54) PIPELINE DISTRIBUTION NETWORK SYSTEMS FOR TRANSPORTATION OF LIQUEFIED NATURAL GAS

(75) Inventors: Ronald R. Bowen, Magnolia; Moses Minta, Sugar Land; James R. Rigby, Kingwood, all of TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/099,267

(22) Filed: Jun. 18, 1998

Related U.S. Application Data (60) Provisional application No. 60/050,280, filed on Jun. 20, 1997, provisional application No. 60/053,966, filed on Jul. 28, 1997, and provisional application No. 60/068,180, filed on Dec. 19, 1997.

(51) Int. Cl.$^7$ .................................................... F17G 7/04
(52) U.S. Cl. .......................... 148/336; 62/50.1; 62/50.2; 420/92; 420/112; 420/119
(58) Field of Search .............................. 148/336; 420/91, 420/92, 112, 119; 62/7, 50.1, 50.2, 633; 137/1

(56) References Cited

U.S. PATENT DOCUMENTS

| 2,004,074 | 6/1935 | Kiley ........................................ 220/85 |
| 2,795,937 | 6/1957 | Sattler et al. ............................... 62/1 |
| 3,097,294 | 7/1963 | Kubli et al. ............................ 219/145 |

(List continued on next page.)

FOREIGN PATENT DOCUMENTS

| 1522609 | * 8/1978 | (GB) . |
| 55-107763 | 8/1980 | (JP) . |
| 7-331328 | * 12/1995 | (JP) . |
| H8-176659 | * 7/1996 | (JP) . |
| WO96/23909 | 8/1996 | (JP) . |
| H8-295982 | * 11/1996 | (JP) . |

OTHER PUBLICATIONS

Reference cited by the Taiwan Patent Office in related application, reference title—"Electronic Welding Operation Handbook Part 1", 1994, pp. 33–41; English language translations of relevant portions as provided by Applicant's agent in Taiwan.

Reference cited by the Taiwan Patent Office in related application, reference title—"Welding Handbook vol. 2", 1993, pp. 190–195; English language translations of relevant portions as provided by Applicant's agent in Taiwan.

K. E. Dorschu et al, "Development of a Filler Metal for a High–Toughness Alloy Plate Steel with a Minimum Yield Strength of 140 ksi", The Welding Journal, Dec. 1964, pp. 564s–575s.

G. G. Saunders, "Effect of Major Alloying Elements on the Toughness of High Strength Weld Metal", Welding Research International, vol. 7, No. 2, 1977, pp. 91–118.

(List continued on next page.)

Primary Examiner—George Wyszomierski
(74) Attorney, Agent, or Firm—Marcy M. Lyles (57) ABSTRACT

Pipeline distribution network systems are provided for transporting pressurized liquefied natural gas at a pressure of about 1035 kPa (150 psia) to about 7590 kPa (1100 psia) and at a temperature of about −123° C. (−190° F.) to about −62° C. (−80° F.). Pipes and other components of the pipeline distribution network systems are constructed from an ultra-high strength, low alloy steel containing less than 9 wt % nickel and having a tensile strength greater than 830 MPa (120 ksi) and a DBTT lower than about −73° C. (−100° F.).

4 Claims, 2 Drawing Sheets

U.S. PATENT DOCUMENTS

| | | | |
|---|---|---|---|
| 3,232,725 | 2/1966 | Secord et al. | 48/190 |
| 3,298,805 | 1/1967 | Secord et al. | 48/190 |
| 3,477,509 | 11/1969 | Arendt | 166/252 |
| 3,745,322 | 7/1973 | Ito et al. | 219/137 |
| 3,853,611 | 12/1974 | Godai et al. | 117/205 |
| 3,864,918 | 2/1975 | Lorenz | 60/651 |
| 3,931,908 | 1/1976 | Cheyney | 220/71 |
| 3,990,256 | 11/1976 | May et al. | 62/53 |
| 4,024,720 | 5/1977 | Dimentberg et al. | 62/55 |
| 4,068,113 | 1/1978 | Godai et al. | 219/146.23 |
| 4,162,158 | 7/1979 | Hwang et al. | 75/124 |
| 4,182,254 | 1/1980 | Secord | 114/74 |
| 4,257,808 | 3/1981 | Morris, Jr. et al. | 75/123 |
| 4,315,407 | 2/1982 | Creed et al. | 62/53 |
| 4,374,478 | 2/1983 | Secord | 73/836.31 |
| 4,459,929 | 7/1984 | Ffooks | 114/74 |
| 4,687,525 | 8/1987 | Biniasz et al. | 148/336 |
| 4,776,900 | 10/1988 | Yano et al. | 148/12 R |
| 5,199,266 | 4/1993 | Johansen | 62/8 |
| 5,484,098 | 1/1996 | Anttila et al. | 228/184 |
| 5,531,842 | 7/1996 | Koo et al. | 148/654 |
| 5,545,269 | 8/1996 | Koo et al. | 148/654 |
| 5,545,270 | 8/1996 | Koo et al. | 148/654 |
| 5,755,895 | 5/1998 | Tamehiro et al. | 148/336 |
| 5,762,119 | 6/1998 | Platz et al. | 141/231 |
| 5,798,004 | 8/1998 | Tamehiro et al. | 148/336 |
| 5,878,814 | 3/1999 | Breivik et al. | 166/267 |
| 6,047,747 * | 4/2000 | Bowen et al. | 420/91 |

OTHER PUBLICATIONS

Roger Ffooks, "Natural Gas by Sea The Development of a New Technology", published 1983 (second edition) by Witherby & Co. Ltd., Chapter 14, especially pp. 162–164 and 175–176. (month of publication not provided; year of publication is sufficiently earlier than priority date that month of publication not in issue).*

R. J. Broeker, "A New Process for the Transportation of Natural Gas", International LNG Conference, Chicago, Apr. 1968, Session No. 5, Paper No. 30.*

C. P. Bennett, "Marine Transportation of LNG at intermediate temperature", CME, Mar. 1979, pp. 63–64.*

E. K. Faridany et al., "The Ocean Phoenix Pressure–LNG System", Gastech 1976, pp. 267–280. (month of publication not provided; year of publication is sufficiently earlier than priority date that month of publication not in issue).*

E. K. M. Faridany et al., "A Pressure LNG System", European Offshore Petroleum Conference & Exhibition, Oct. 21–24, 1980, vol. EUR 171, pp. 245–254.*

Broeker, R. J. "CNG and MLG–New Natural Gas Transportation Process", pp. 138–140, American Gas Journal, Jul. 1969.*

Prof. E. F. Fluggen and Dr. I. H. Backhaus, "Pressurised LNG—and the Utilisation of Small Gas Fields", Gastech 78 LNG/LPG Conference (Monte Carlo, Nov. 7–10, 1978) Proceedings, pp. 195–204.*

* cited by examiner

PIPELINE DISTRIBUTION NETWORK SYSTEMS FOR TRANSPORTATION OF LIQUEFIED NATURAL GAS

This application claims the benefit of (i) U.S. Provisional Application No. 60/050280, filed Jun. 20, 1997; (ii) U.S. Provisional Application No. 60/053966, filed Jul. 28, 1997; and (iii) U.S. Provisional Application No. 60/068180, filed Dec. 19, 1997.

FIELD OF THE INVENTION

The present invention relates to pipe line distribution network systems for transportation of pressurized liquefied natural gas (PLNG), and more particularly, to such systems having pipes and other components that are constructed from an ultra-high strength, low alloy steel containing less than 9 wt % nickel and having a tensile strength greater than 830 MPa (120 ksi) and a DBTT lower than about −73° C. (−100° F.).

BACKGROUND OF THE INVENTION

Various terms are defined in the following specification. For convenience, a Glossary of terms is provided herein, immediately preceding the claims.

Many sources of natural gas are located in remote areas, great distances from any commercial markets for the gas. Sometimes a pipeline is available for transporting produced natural gas to a commercial market. When pipeline transportation to a commercial market is not feasible, produced natural gas is often processed into LNG for transport to market. The LNG is typically transported via specially built tanker ships, and then stored and revaporized at an import terminal near the market. The equipment used to liquefy, transport, store, and revaporize natural gas is generally quite expensive; and a typical conventional LNG project can cost from $5 billion to $10 billion, including field development costs. A typical "grass roots" LNG project requires a minimum natural gas resource of about 280 Gm$^3$ (10 TCF (trillion cubic feet)) and the LNG customers are generally large utilities. Often, natural gas resources discovered in remote areas are smaller than 280 Gm$^3$ (10 TCF). Even for natural gas resource bases that meet the 280 Gm$^3$ (10 TCF) minimum, very long-term commitments of 20 years or more from all involved, i.e., the LNG supplier, the LNG shipper, and the large utility LNG customer, are required to economically process, store, and transport the natural gas as LNG. Where potential LNG customers have an alternative source of gas, such as pipeline gas, the conventional LNG chain of delivery is often not economically competitive.

A conventional LNG plant produces LNG at temperatures of about −162° C. (−260° F.) and at atmospheric pressure. A typical natural gas stream enters a conventional LNG plant at pressures from about 4830 kPa (700 psia) to about 7600 kPa (1100 psia) and temperatures from about 21° C. (70° F.) to about 38° C. (100° F.). Up to about 350,000 refrigeration horsepower are needed to reduce the temperature of the natural gas to the very low outlet temperature of about −162° C. (−260° F.) in a conventional two-train LNG plant. Water, carbon dioxide, sulfur-containing compounds, such as hydrogen sulfide, other acid gases, n-pentane and heavier hydrocarbons, including benzene, must be substantially removed from the natural gas during conventional LNG processing, down to parts-per-million (ppm) levels, or these compounds will freeze, causing plugging problems in the process equipment. In a conventional LNG plant, gas treating equipment is required to remove the carbon dioxide and acid gases. The gas treating equipment typically uses a chemical and/or physical solvent regenerative process and requires a significant capital investment. Also, the operating expenses are high in relation to those for other equipment in the plant. Dry bed dehydrators, such as molecular sieves, are required to remove the water vapor. The scrub column and fractionation equipment are used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapors in LNG containers at the point of delivery is undesirable.

Containers, piping, and other equipment used in a conventional LNG plant are typically constructed, at least in part, from aluminum or nickel-containing steel (e.g., 9 wt % nickel), to provide the necessary fracture toughness at the extremely cold processing temperatures. Expensive materials with good fracture toughness at low temperatures, including aluminum and commercial nickel-containing steel (e.g., 9 wt % nickel), are typically used to contain the LNG in the LNG ships and at the import terminals, in addition to their use in the conventional plant.

A typical conventional LNG ship utilizes large spherical containers, known as Moss spheres, to store the LNG during transport. These ships currently cost more than about $230 million each. A typical conventional project to produce LNG in the Middle East and transport it to the Far East night require 7 to 8 of these ships for a total cost of about $1.6 billion to $2.0 billion.

As can be determined from the above discussion, the need exists for a more economical system for processing, storing, and transporting LNG to commercial markets to allow remote natural gas resources to compete more effectively with alternative energy supplies. Furthermore, a system is needed to commercialize smaller remote natural gas resources that would otherwise be uneconomical to develop. In addition, a more economical gasification and distribution system is needed so that LNG can be made economically attractive to smaller consumers.

Consequently, the primary objects of the present invention are to provide a more economical system for processing, storing, and transporting LNG from remote sources to commercial markets and to substantially reduce the threshold size of both the reserve and the market required to make an LNG project economically feasible. One way to accomplish these objects would be to process the LNG at higher pressures and temperatures than is done in a conventional LNG plant, i.e., at pressures higher than atmospheric pressure and temperatures higher than −162° C. (−260° F.). While the general concept of processing, storing, and transporting LNG at increased pressures and temperatures has been discussed in industry publications, these publications generally discuss constructing transportation containers from nickel-containing steel (e.g., 9 wt % nickel) or aluminum, both of which may meet design requirements but are very expensive materials. For example, at pp. 162–164 of his book *NATURAL GAS BY SEA The Development of a New Technology*, published by Witherby & Co. Ltd., first edition 1979, second edition 1993, Roger Ffooks discusses the conversion of the Liberty ship Sigalpha to carry either MLG (medium condition liquefied gas) at 1380 kPa (200 psig) and −115° C. (−175° F.), or CNG (compressed natural gas) processed at 7935 kPa (1150 psig) and −60° C. (−75° F.). Mr. Ffooks indicates that although technically proven, neither of the two concepts found 'buyers'—largely due to the high cost of storage. According to a paper on the subject referenced by Mr. Ffooks, for CNG service, i.e., at −60° C. (−75° F.), the design target was a low alloy, weldable, quenched and tempered steel with good strength (760 MPa (110 ksi)) and good fracture toughness at operating conditions. (See "A new process for the transportation of natural gas" by R. J. Broeker, International LNG Conference, Chicago, 1968.) This paper also indicates that an aluminum alloy was the lowest cost alloy for MLG service, i.e., at the much lower temperature of −115° C. (−175° F.). Also, Mr. Ffooks discusses, at p. 164, the Ocean Phoenix Transport design, working at a much lower pressure of about 414 kPa (60 psig), with tanks that could be constructed of 9 percent nickel steel or aluminum alloy; and indicates that, again, the concept did not appear to offer sufficient technical or financial advantages to become commercialized. See also: (i) U.S. Pat. No. 3,298,805, which discusses the use of a 9% nickel content steel or a high strength aluminum alloy for making containers for the transport of a compressed natural gas; and (ii) U.S. Pat. No. 4,182,254, which discusses tanks of 9% nickel or similar steel for the transport of LNG at temperatures from −100° C. (−148° F.) to −140° C. (−220° F.) and pressures of 4 to 10 atmospheres (i.e., of 407 kPa (59 psia) to 1014 kPa (147 psia)); (iii) U.S. Pat. No. 3,232,725, which discusses transportation of a natural gas in a dense phase single-fluid state at a temperature as low as −62° C. (−80° F.), or in some cases −68° C. (−90° F.), and at pressures at least 345 kPa (50 psi) above the boiling point pressure of the gas at operating temperatures, using containers constructed from materials such as 1 to 2 percent nickel steel which has been quenched and tempered to secure an ultimate tensile strength approaching 120,000 psi; and (iv) "Marine Transportation of LNG at Intermediate Temperature", CME March 1979, by C. P. Bennett, which discusses a case study of transport of LNG at a pressure of 3.1 MPa (450 psi) and a temperature of −100° C. (−140° F.) using a storage tank constructed from a 9% Ni steel or a 3½% Ni quenched and tempered steel and having 9½ inch thick walls.

Although these concepts are discussed in industry publications, to our knowledge, LNG is not currently commercially processed, stored, and transported at pressures substantially higher than atmospheric pressure and temperatures substantially higher than −162° C. (−260° F.). This is likely due to the fact that an economical system for processing, storing, transporting, and distributing LNG at such pressures and temperatures, both via sea and via land, has not heretofore been made commercially available.

Nickel-containing steels conventionally used for cryogenic temperature structural applications, e.g., steels with nickel contents of greater than about 3 wt %, have low DBTTs (a measure of toughness, as defined herein), but also have relatively low tensile strengths. Typically, commercially available 3.5 wt % Ni, 5.5 wt % Ni, and 9 wt % Ni steels have DBTTs of about −100° C. (−150° F.), −155° C. (−250° F.), and −175° C. (−280° F.), respectively, and tensile strengths of up to about 485 MPa (70 ksi), 620 MPa (90 ksi), and 830 MPa (120 ksi), respectively. In order to achieve these combinations of strength and toughness, these steels generally undergo costly processing, e.g., double annealing treatment. In the case of cryogenic temperature applications, industry currently uses these commercial nickel-containing steels because of their good toughness at low temperatures, but must design around their relatively low tensile strengths. The designs generally require excessive steel thicknesses for load-bearing, cryogenic temperature applications. Thus, use of these nickel-containing steels in load-bearing, cryogenic temperature applications tends to be expensive due to the high cost of the steel combined with the steel thicknesses required.

A co-pending U.S. patent application ("the PLNG Patent Application"), entitled "Improved System for Processing, Storing, and Transporting Liquefied Natural Gas", describes containers and tanker ships for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). The PLNG Patent Application has a priority date of Jun. 20, 1997 and is identified by the United States Patent and Trademark Office ("USPTO") as application Ser. No. 09/099268 and has been published in WO 98/59085. However, the PLNG Patent Application does not describe pipeline distribution network systems for transportation of PLNG.

LNG and other cryogenic fluids, for example, liquid oxygen, liquid hydrogen, and liquid helium, are transported routinely truck from central processing facilities to end-user sites. Liquid nitrogen is transported across university campuses and facilities, for example, via pipeline distribution network systems. The market for LNG, in particular, has grown in recent years because of the clean-burning characteristics of natural gas. Although natural gas is normally supplied through a pipeline distribution network system, to our knowledge, there are currently no commercial pipeline distribution network systems for PLNG. Delivery of produced natural gas in the form of PLNG, as compared to LNG, can be beneficial to the end-user because the PLNG is more economically processed, provided that an economical means for transporting and delivering the PLNG is made available. Additionally, as compared to CNG, the higher liquid density of PLNG translates into higher product mass or energy for a given volume.

Carbon steels that are commonly used in construction of commercial pipeline distribution network systems for fluids such as natural gas do not have adequate fracture toughness at cryogenic temperatures, i.e., temperatures lower than about −40° C. (−40° F.). Other materials with better cryogenic temperature fracture toughness than carbon steel, e.g., the above-mentioned commercial nickel-containing steels (3½ wt % Ni to 9 wt % Ni) with tensile strengths up to about 830 MPa (120 ksi), aluminum (Al–5083 or Al–5085), or stainless steel, are traditionally used to construct pipeline distribution network systems that are subject to cryogenic temperature conditions. Also, specialty materials such as titanium alloys and special epoxy-impregnated woven fiberglass composites may be used. These materials tend to be expensive and, therefore, can often make projects economically unattractive. These disadvantages make currently commercially available materials economically unattractive for constructing pipeline distribution network systems for transportation of PLNG. The discovery of containers suitable for marine transport of PLNG, as discussed in the PLNG Patent Application, combined with current capabilities for processing PLNG, make eminent the need for pipeline distribution network systems for economically attractive land-based transportation of PLNG, as well as that of LNG and other cryogenic fluids.

The availability of a more cost-effective source of natural gas transported and distributed in the form of a liquid would provide a significant advancement in the ability to utilize natural gas as a fuel source. The following are brief descriptions of existing and emerging applications that use natural gas for energy and that would benefit significantly from the availability of a more economical system for land-based transport and delivery of natural gas, such as pipeline distribution network systems.

LNG is routinely trucked to meet fuel needs at remote sites where the infrastructure for natural gas distribution does not exist. Additionally, local conditions are increasingly making transported LNG a competitive economic alternative to gas pipelines for several major energy projects. An Alaskan gas company has proposed a $200 Million project for remote LNG baseload systems in seventeen communities in southeastern Alaska. The company also expects to truck LNG 300 miles from a liquefaction plant on Cook Inlet to Fairbanks starting in November, 1997. In eastern Arizona, a recent feasibility study has shown that remote baseload LNG supply facilities may offer an attractive lower-cost energy solution to a number of isolated communities without current access to gas pipelines. These represent new trends in large-volume LNG transportation and usage with potential for substantial growth, particularly with improved economics of the transportation system. The emerging PLNG technology could make economically feasible the use of PLNG as fuel in these and other similar land-based applications, if a more economical means of land-based transportation of PLNG, such as pipeline distribution network systems, were available.

Further, there is an increasing growth in the use of 'portable pipeline'—transportable LNG/vaporizer—systems to maintain continuous uninterrupted gas supply. This is to help gas companies avoid service interruption and to continue the flow of natural gas to customers during peak demand periods, such as cold winter days, emergency from a damaged underground pipe, maintenance on a gas system, etc. Depending on the particular application, an LNG vaporizer may be installed or located at a strategic spot on the natural gas distribution system, and when operating conditions warrant, LNG tanker trucks are brought in to provide the LNG that is vaporized. Currently, to our knowledge, there are no commercial PLNG pipeline distribution network systems for transporting PLNG, instead of LNG, to such a vaporizer for providing additional gas during peak demands.

Finally, there are projections that several of the current and future major LNG importers in Asia offer the most potential for LNG use as vehicle fuel (as much as 20% of imports). Pipeline distribution network system transportation of LNG to the refueling stations may be the most attractive economic option depending on local conditions. In particular, in the absence of in existing infrastructure for gas distribution, cost-effective pipeline distribution system design may make PLNG, distribution a more attractive and economic alternative.

A need exists for economical systems is for pipeline distribution network transportation of PLNG to allow remote natural gas resources to compete more effectively with alternative energy supplies.

Therefore, a particular object of the present invention is to provide an economical pipeline distribution network systems for distribution of LNG at substantially increased pressures and temperatures over conventional LNG systems. Another object of the present invention is to provide such pipeline distribution network systems having pipes and other components that are constructed from materials having adequate strength and fracture toughness to contain said pressurized liquefied natural gas.

SUMMARY OF THE INVENTION

Consistent with the above-stated objects of the present invention, pipeline distribution network systems are provided for transportation of pressurized liquefied natural gas (PLNG) at a pressure in the range of about 1035 kPa (150 psia) to about 7590 kPa (1100 psia) and at a temperature in the range of about −123° C. (−190° F.) to about −62° C. (−80° F.). The pipeline distribution network systems of this invention have pipes and other components that are constructed from materials comprising an ultra-high strength, low alloy steel containing less than 9 wt % nickel and having adequate strength and fracture toughness to contain said pressurized liquefied natural gas. The steel has an ultra-high strength, e.g., tensile strength (as defined herein) greater than 830 MPa (120 ksi), and a DBTT (as defined herein) lower than about −73° C. (−100° F.).

BRIEF DESCRIPTION OF THE DRAWINGS

The advantages of the present invention will be better understood by referring to the following detailed description and the attached drawing in which.

While the invention will be described in connection with its preferred embodiments, it will be understood that the invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

The present invention relates to pipeline distribution network systems for transport of PLNG. Pipeline distribution network systems are provided for transporting pressurized liquefied natural gas (PLNG) at a pressure of about 1035 kPa (150 psia) to about 7590 kPa (1100 psia) and at a temperature of about −123° C. (−190° F.) to about −62° C. (−80° F.), wherein the pipeline distribution network systems have pipes and other components that are constructed from materials comprising an ultra-high strength, low alloy steel containing less than 9 wt % nickel and having a tensile strength greater than 830 MPa (120 ksi) and a DBTT lower than about −73° C. (−100° F.). Further, pipeline distribution network systems are provided for transporting pressurized liquefied natural gas at a pressure of about 1725 kPa (250 psia) to about 4830 kPa (700 psia) and at a temperature of about −112° C. (−170° F.) to about −79° C. (−110° F.), wherein the pipeline distribution network systems have pipes and other components that (i) are constructed from materials comprising an ultra-high strength, low alloy steel containing less than 9 wt % nickel and (ii) have adequate strength and fracture toughness to contain said pressurize liquefied natural gas.

PLNG Transport Pipes

The key to achieving the pipeline distribution network systems of the present invention are pipes suitable for containing aid transporting PLNG at a pressure of about 1035 kPa (150 psia) to about 7590 kPa (1100 psia) and at a temperature of about −123° C. (−190° F.) to about −62° C. (−80° F.). Preferably, PLNG is produced and transported at a pressure in the range of about 1725 kPa (250 psia) to about 7590 kPa (1100 psia) and at a temperature in the range of about −112° C. (−170° F.) to about −62° C. (−80° F.). More preferably, PLNG is produced and transported at a pressure in the range of about 2415 kPa (350 psia) to about 4830 kPa (700 psia) and at a temperature in the range of about −101° C. (−150° F.) to about −79° C. (−110° F.). Even more preferably, the lower ends of the pressure and temperature ranges for PLNG are about 2760 kPa (400 psia) and about −96° C. (−140 ° F.). A pipe is provided for containing and transporting PLNG, wherein said pipe is constructed from a material comprising an ultra-high strength, low alloy steel containing less than 9 wt % nickel and having a tensile strength greater than 830 MPa (120 ksi) and a DBTT lower than about −73° C. (−100° F.). Additionally, other system components such as fittings are provided, wherein said fittings are constructed from material comprising an ultra-high strength, low alloy steel containing less than 9 wt % nickel and having a tensile strength greater than 830 MPa (120 ksi) and a DBTT lower than about −73° C. (−100° F.). Storage containers suitable for use in the pipeline distribution network systems of this invention are described in greater detail in the PLNG Patent Application.

Steel for Construction of Pipes and Other Components

Any ultra-high strength, low alloy steel containing less than 9 wt % nickel and having adequate toughness for containing cryogenic temperature fluids, such as PLNG, at operating conditions, according to known principles of fracture mechanics as described herein, may be used for constructing the pipes and other components of this invention. An example steel for use in the present invention, without thereby limiting the invention, is a weldable, ultra-high strength, low alloy steel containing less than 9 wt % nickel and having a tensile strength greater than 830 MPa (120 ksi) and adequate toughness to prevent initiation of a fracture, i.e., a failure event, at cryogenic temperature operating conditions. Another example steel for use in the present invention, without thereby limiting the invention, is a weldable, ultra-high strength, low alloy steel containing less than about 3 wt % nickel and having a tensile strength of at least about 1000 MPa (145 ksi) and adequate toughness to prevent initiation of a fracture, i.e., a failure event, at cryogenic temperature operating conditions. Preferably these example steels have DBTTs of lower than about −73° C. (−100° F.).

Recent advances in steel making technology have made possible the manufacture of new, ultra-high strength, low alloy steels with excellent cryogenic temperature toughness. For example, three U.S. patents issued to Koo et al., 5,531,842, 5,545,269, and 5,545,270, describe new steels and methods for processing these steels to produce steel plates with tensile strengths of about 830 MPa (120 ksi), 965 MPa (140 ksi), and higher. The steels and processing methods described therein have been improved and modified to provide combined steel chemistries and processing for manufacturing ultra-high strength, low alloy steels with excellent cryogenic temperature toughness in both the base steel and in the heat affected zone (HAZ) when welded. These ultra-high strength, low alloy steels also have improved toughness over standard commercially available ultra-high strength, low alloy steels. The improved steels are described in a co-pending U.S. patent application entitled "ULTRA-HIGH STRENGTH STEELS WITH EXCELLENT CRYOGENIC TEMPERATURE TOUGHNESS", which has a priority date of Dec. 19, 1997 and is identified by the United States Patent and Trademark Office ("USPTO") as application Ser. No. 09/099649 and has been published in WO 99/32670; in a co-pending U.S. patent application entitled "ULTRA-HIGH STRENGTH AUSAGED STEELS WITH EXCELLENT CRYOGENIC TEMPERATURE TOUGHNESS", which has a priority date of Dec. 19, 1997 and is identified by the USPTO as application Ser. No. 09/099153 and has been published in WO 99/32670 and in a co-pending U.S. patent application entitled "ULTRA-HIGH STRENGTH DUAL PHASE STEELS WITH EXCELLENT CRYOGENIC TEMPERATURE TOUGHNESS", which has a priority date of Dec. 19, 1997 and is identified by the USPTO as application Ser. No. 09/099152 and has been published in WO 99/32671 (collectively, the "Steel Patent Applications").

The new steels described in the Steel Patent Applications, and further described in the examples below, are especially suitable for constructing the containers for storing and transporting PLNG of this invention in that the steels have the following characteristics, preferably for steel plate thicknesses of about 2.5 cm (1 inch) and greater: (i) DBTT lower than about −73° C. (−100° F.), preferably lower than about −107° C. (−160° F.), in the base steel and in the weld HAZ; (ii) tensile strength greater than 830 MPa (120 ksi), preferably greater than about 860 MPa (125 ksi), and more preferably greater than about 900 MPa (130 ksi); (iii) superior weldability; (iv) substantially uniform through-thickness microstructure and properties; and (v) improved toughness over standard, commercially available, ultra-high strength, low alloy steels. Even more preferably, these steels have a tensile strength of greater than about 930 MPa (135 ksi), or greater than about 965 MPa (140 ksi), or greater than about 1000 MPa (145 ksi).

FIRST STEEL EXAMPLE

As discussed above, a copending U.S. patent application, having a priority date of Dec. 19, 1997, entitled "Ultra-High Strength Steels With Excellent Cryogenic Temperature Toughness", and identified by the USPTO as application Ser. No. 09/099649, provides a description of steels suitable for use in the present invention. A method is provided for preparing an ultra-high strength steel plate having a microstructure comprising predominantly tempered fine-grained lath martensite, tempered fine-grained lower bainite, or mixtures thereof, wherein the method comprises the steps of (a) heating i steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further educing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature below about the $M_s$ transformation temperature plus 200° C. (360° F.); (e) stopping the quenching; and (f) tempering the steel plate at a tempering temperature from about 400° C. (752° F.) up to about the $Ac_1$ transformation temperature, preferably up to, but not including, the $Ac_1$ transformation temperature, for a period of time sufficient to cause precipitation of hardening particles, i.e., one or more of ϵ-copper, $Mo_2C$, or the carbides and carbonitrides of niobium and vanadium. The period of time sufficient to cause precipitation of hardening particles depends primarily on the thickness of the steel plate, the chemistry of the steel plate, and the tempering temperature, and can be determined by one skilled in the art. (See Glossary for definitions of predominantly, of hardening particles, of $T_{nr}$ temperature, of $Ar_3$, $M_s$, and $Ac_1$ transformation temperatures, and of $Mo_2C$.).

To ensure ambient and cryogenic temperature toughness, steels according to this first steel example preferably have a microstructure comprised of predominantly tempered fine-grained lower bainite, tempered fine-grained lath martensite, or mixtures thereof. It is preferable to substantially minimize the formation of embrittling constituents such as upper bainite, twinned martensite and MA. As used in this first steel example, and in the claims, "predominantly" means at least about 50 volume percent. More preferably, the microstructure comprises at least about 60 volume percent to about 80 volume percent tempered fine-grained lower bainite, tempered fine-grained lath martensite, or mixtures thereof. Even more preferably, the microstructure comprises at least about 90 volume percent tempered fine-grained lower bainite, tempered fine-grained lath martensite, or mixtures thereof. Most preferably, the microstructure comprises substantially 100% tempered fine-grained lath martensite.

A steel slab processed according to this first steel example is manufactured in a customary fashion and, in one embodiment, comprises iron and the following alloying elements, preferably in the weight ranges indicated in the following Table I:

TABLE I

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.5, more preferably 0.5–1.0 |
| molybdenum (Mo) | 0.1–0.8, more preferably 0.2–0.5 |
| niobium (Nb) | 0.02–0.1, more preferably 0.03–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Vanadium (V) is sometimes added to the steel, preferably up to about 0.10 wt %, and more preferably about 0.02 wt % to about 0.05 wt %.

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel it expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this first steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST (as defined in the Glossary) below about the $M_s$ transformation temperature plus 200° C. (360° F.), at which time the quenching is terminated. In one embodiment of this first steel example, the steel plate is then air cooled to ambient temperature. This processing is used to produce a microstructure preferably comprising predominantly fine-grained lath martensite, fine-grained lower bainite, or mixtures thereof, or, more preferably comprising substantially 100% fine-grained lath martensite.

The thus direct quenched martensite in steels according to this first steel example has high strength but its toughness can be improved by tempering at a suitable temperature from above about 400° C. (752° F.) up to about the $Ac_1$ transformation temperature. Tempering of steel within this temperature range also leads to reduction of the quenching stresses which in turn leads to enhanced toughness. While tempering can enhance he toughness of the steel, it normally leads to substantial loss of strength. In the present invention, the usual strength loss from tempering is offset by inducing precipitate dispersion hardening. Dispersion hardening from fine copper precipitates and mixed carbides and/or carbonitrides are utilized to optimize strength and toughness during the tempering of the martensitic structure. The unique chemistry of the steel of this first steel example allows for tempering within the broad range of about 400° C. to about 650° C. (750° F.–1200° F.) without any significant loss of the as-quenched strength. The steel plate is preferably tempered at a tempering temperature from a above about 400° C. (752° F.) to below the $Ac_1$ transformation temperature for a period of time sufficient to cause precipitation of hardening particles (as defined herein). This processing facilitates transformation of the microstructure of the steel plate to predominantly tempered fine-grained lath martensite, tempered fine-grained lower bainite, or mixtures thereof. Again, the period of time sufficient to cause precipitation of hardening particles depends primarily on the thickness of the steel plate the chemistry of the steel plate, and the tempering temperature, and can be determined by one skilled in the art.

SECOND STEEL EXAMPLE

As discussed above, a copending U.S. patent application, having a priority date of Dec. 19, 1997, entitled "Ultra-High Strength Ausaged Steels With Excellent Cryogenic Temperature Toughness", and identified by the USPTO as application Ser. No. 09/099153, provides a description of other steels suitable for use in the present invention. A method is provided for preparing an ultra-high strength steel plate having a micro-laminate microstructure comprising about 2 vol % to about 10 vol % austenite film layers and about 90 vol % to about 98 vol % laths of predominantly fine-grained martensite and fine-grained lower bainite, said method comprising the steps of: (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (e) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature (QST) below about the $M_s$ transformation temperature plus 100° C. (180° F.) and above about the $M_s$ transformation temperature; and (e) stopping said quenching. In one embodiment, the method of this second steel example further comprises the step of allowing the steel plate to air cool to ambient temperature from the QST. In another embodiment, the method of this second steel example further comprises the step of holding the steel plate substantially isothermnally at the QST for up to about 5 minutes prior to allowing the steel plate to air cool to ambient temperature. In yet another embodiment, the method of this second steel example further comprises the step of slow-cooling the steel plate from the QST at a rate lower than about 1.0° C. per second (1.8° F./sec) for up to about 5 minutes prior to allowing the steel plate to air cool to ambient temperature. In yet another embodiment, the method of this invention further comprises the step of slow-cooling the steel plate from the QST at a rate lower than about 1.0° C. per second (1.8° F./sec) for up to about 5 minutes prior o allowing the steel plate to air cool to ambient temperature. This processing facilitates transformation of the microstructure of the steel plate to about 2 vol % to about 10 vol % of austenite film layers and about 90 vol % to about 98 vol % laths of predominantly fine-grained martensite and fine-grained lower bainite. (See Glossary for definitions of $T_{nr}$ temperature, and of $Ar_3$ and $M_s$ transformation temperatures.)

To ensure ambient and cryogenic temperature toughness, the laths in the micro-laminate microstructure preferably comprise predominantly lower bainite or martensite. It is preferable to substantially minimize the formation of embrittling constituents such as upper bainite, twinned martensite and MA. As used in this second steel example, and in the claims, "predominantly" means at least about 50 volume percent. The remainder of the microstructure can comprise additional fine-grained lower bainite, additional fine-grained lath martensite, or ferrite. More preferably, the microstructure comprises at least about 60 volume percent to about 80 volume percent lower bainite or lath martensite. Even more preferably, the microstructure comprises at least about 90 volume percent lower bainite or lath martensite.

A steel slab processed according to this second steel example is manufactured in a customary fashion and, in one embodiment, comprises iron and the following alloying elements, preferably in the weight ranges indicated in the following Table II:

TABLE II

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.0, more preferably 0.2–0.5 |
| molybdenum (Mo) | 0.1–0.8, more preferably 0.2–0.4 |
| niobium (Nb) | 0.02–0.1, more preferably 0.02–0.05 |

TABLE II-continued

| Alloying Element | Range (wt %) |
| --- | --- |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferable substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this second steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST below about the $M_s$ transformation temperature plus 100° C. (180° F.) and above about the $M_s$ transformation temperature, at which time the quenching is terminated. In one embodiment of this second steel example, after quenching is terminated the steel plate is allowed to air cool to ambient temperature from the QST. In another embodiment of this second steel example, after quenching is terminated the steel plate is held substantially isothermally at the QST for a period of time, preferably up to about 5 minutes, and then air cooled to ambient temperature. In yet another embodiment, the steel plate is slow-cooled at a rate slower than that of air cooling, i.e., at a rate lower than about 1° C. per second (1.8° F./sec), preferably for up to about 5 minutes. In yet another embodiment, the steel plate is slow-cooled from the QST at a rate slower than that of air cooling, i.e., at a rate lower than about 1° C. per second (1.8° F./sec), preferably for up to about 5 minutes. In at least one embodiment of this second steel example, the $M_s$ transformation temperature is about 350° C. (662° F.) and, therefore, the $M_s$ transformation temperature plus 100° C. (180° F.) is about 450° C. (842° F.).

The steel plate may be held substantially isothermally at the QST by any suitable means, as are known to those skilled in the art, such as by placing a thermal blanket over the steel plate. The steel plate may be slow-cooled after quenching is terminated by any suitable means, as are known to those skilled in the art, such as by placing an insulating blanket over the steel plate.

THIRD STEEL EXAMPLE

As discussed above, a copending U.S. patent application, having a priority date of Dec. 19, 1997, entitled "Ultra-High Strength Dual Phase Steels With Excellent Cryogenic Temperature Toughness", and identified by the USPTO as application Ser. No. 09/099152, provides a description of other steels suitable for use in the present invention. A method is provided for preparing an ultra-high strength, dual phase steel plate having a microstructure comprising about 10 vol % to about 40 vol % of a first phase of substantially 100 vol % (i.e., substantially pure or "essentially") ferrite and about 60 vol % to about 90 vol % of a second phase of predominantly fine-grained lath martensite, fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) further reducing said steel plate in one or more hot rolling passes in a third temperature range below about the $Ar_3$ transformation temperature and above about the $Ar_1$ transformation temperature (i.e., the intercritical temperature range); (e) quenching said steel plate at a cooling rate of about 10° C. per second to about 40° C. per second (18° F./sec–72° F./sec) to a Quench Stop Temperature (QST) preferably below about the $M_s$ transformation temperature plus 200° C. (360° F.); and (f) stopping said quenching. In another embodiment of this third steel example, the QST is preferably below about the $M_s$ transformation temperature plus 100° C. (180° F.), and is more preferably below about 350° C. (662° F.). In one embodiment of this third steel example, the steel plate is allowed to air cool to ambient temperature after step (f). This processing facilitates transformation of the microstructure of the steel plate to about 10 vol % to about 40 vol % of a first phase of ferrite and about 60 vol % to about 90 vol % of a second phase of predominantly fine-grained lath martensite, fine-grained lower bainite, or mixtures thereof. (See Glossary for definitions of $T_{nr}$ temperature and of $Ar_3$ and $Ar_1$ transformation temperatures.)

To ensure ambient and cryogenic temperature toughness, the microstructure of the second phase in steels of this third steel example comprises predominantly fine-grained lower bainite, fine-grained lath martensite, or mixtures thereof. It is preferable to substantially minimize the formation of embrittling constituents such as upper bainite, twinned martensite and MA in the second phase. As used in this third steel example, and in the claims, "predominantly" means at least about 50 volume percent. The remainder of the second phase microstructure can comprise additional fine-grained lower bainite, additional fine-grained lath martensite, or ferrite. More preferably, the microstructure of the second phase comprises at least about 60 volume percent to about 80 volume percent fine-grained lower bainite, fine-grained lath martensite, or mixtures thereof. Even more preferably, the microstructure of the second phase comprises at least about 90 volume percent fine-grained lower bainite, fine-grained lath martensite, or mixtures thereof.

A steel slab processed according to this third steel example is manufactured in a customary fashion and, in one embodiment, comprises iron and the following alloying elements, preferably in the weigh ranges indicated in the following Table III:

TABLE III

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| niobium (Nb) | 0.02–0.1, more preferably 0.02–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Molybdenum (Mo) is sometimes added to the steel, preferably up to about 0.8 wt %, and more preferably about 0.1 wt % to about 0.3 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Copper (Cu), preferably in the range of about 0.1 wt % to about 1.0 wt %, more preferably in the range of about 0.2 wt % to about 0.4 wt %, is sometimes added to the steel.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this third steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, further hot rolling the steel plate in one or more passes providing about 40 percent to about 80 percent reduction in a second temperature range below about the $T_{nr}$ temperature and above about the $Ar_3$ transformation temperature, and finish rolling the steel plate in one or more passes to provide about 15 percent to about 50 percent reduction in the intercritical temperature range below about the $Ar_3$ transformation temperature and above about the $Ar_1$ transformation temperature. The hot rolled steel plate is then quenched at a cooling rate of about 10° C. per second to about 40° C. per second (18° F./sec–72° F./sec) to a suitable Quench Stop Temperature (QST) preferably below about the $M_s$ transformation temperature plus 200° C. (360° F.), at which time the quenching is terminated. In another embodiment of this invention, the QST is preferably below about the $M_s$ transformation temperature plus 100° C. (180° F.), and is more preferably below about 350° C. (662° F.). In one embodiment of this third steel example, the steel plate is allowed to air cool to ambient temperature after quenching is terminated.

In the three example steels above, since Ni is an expensive alloying element, the Ni content of the steel is preferably less than about 3.0 wt %, more preferably less than about 2.5 wt %, more preferably less than about 2.0 wt %, and even more preferably less than about 1.8 wt %, to substantially minimize cost of the steel.

Other suitable steels for use in connection with the present invention are described in other publications that describe ultra-high strength, low alloy steels containing less than about 1 wt % nickel, having tensile strengths greater than 830 MPa (120 ksi), and having excellent low-temperature toughness. For example, such steels are described in a European Patent Application published Feb. 5, 1997, and having International application number: PCT/JP96/00157, and International publication number WO 96/23909 (08.08.1996 Gazette 1996/36) (such steels preferably having a copper content of 0.1 wt % to 1.2 wt %), and in a pending U.S. patent application with a priority date of Jul. 28, 1997, entitled "Ultra-High Strength, Weldable Steels with Excellent Ultra-Low Temperature Toughness", and identified by the USPTO as applicatioin Ser. No. 09/123625 and published in WO 99/05335.

For any of the above-referenced steals, as is understood by those skilled in the art, as used herein "percent reduction in thickness" refers to percent reduction in the thickness of the steel slab or plate prior to the reduction referenced. For purposes of explanation only, without thereby limiting this invention, a steel slab of about 25.4 cm (10 inches) thickness may be reduced about 50% (a 50 percent reduction), in a first temperature range, to a thickness of about 12.7 cm (5 inches) then reduced about 80% (an 80 percent reduction), in a second temperature range, to a thickness of about 2.5 cm (1 inch). Again, for purposes of explanation only, without thereby limiting this invention, a steel slab of about 25.4 cm (10 inches) may be reduced about 30% (a 30 percent reduction), in a first temperature range, to a thickness of about 17.8 cm (7 inches) then reduced about 80% (an 80 percent reduction), in a second temperature range, to a thickness of about 3.6 cm (1.4 inch), and then reduced about 30% (a 30 percent reduction), in a third temperature range, to a thickness of about 2.5 cm (1 inch). As used herein, "slab" means a piece of steel having any dimensions.

For any of the above-referenced steels, as is understood by those skilled in the art, the steel slab is preferably reheated by a suitable means for raising the temperature of substantially the entire slab, preferably the entire slab, to the desired reheating temperature, e.g., by placing the slab in a furnace for a period of time. The specific reheating temperature that should be used for any of the above-referenced steel compositions may be readily determined by a person skilled in the art, either by experiment or by calculation using suitable models. Additionally, the furnace temperature and reheating time necessary to raise the temperature of substantially the entire slab, preferably the entire slab, to the desired reheating temperature may be readily determined by a person skilled in the art by reference to standard industry publications.

For any of the above-referenced steels, as is understood by those skilled in the art, the temperature that defines the boundary between the recrystallization range and non-recrystallization range, the $T_{nr}$ temperature, depends on the chemistry of the steel, and more particularly, on the reheating temperature before rolling, the carbon concentration, the niobium concentration and the amount of reduction given in the rolling passes. Persons skilled in the art mar determine this temperature for each steel composition either by experiment or by model calculation. Likewise, the $Ac_1$, $Ar_1$, $Ar_3$, and $M_s$ transformation temperatures referenced herein may be determined by persons skilled in the art for each steel composition either by experiment or by model calculation.

For any of the above-referenced steels, as is understood by those skilled in the art, except for the reheating temperature, which applies to substantially the entire slab, subsequent temperatures referenced in describing the processing methods of this invention are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable high strength and toughness for use in constructing the pipes and other components of the present invention. Other suitable steels may exist or be developed hereafter. All such steels are within the scope of the present invention.

A person of skill in the art has the requisite knowledge and skill to use the information provided herein to produce ultra-high strength, low alloy steel plates having modified thicknesses, compared to the thicknesses of the steel plates produced according to the examples provided herein, while still producing steel plates having suitable high strength and suitable cryogenic temperature toughness for use in the system of the present invention. For example, one skilled in the art may use the information provided herein to produce a steel plate with a thickness of about 2.54 cm (1 inch) and suitable high strength and suitable cryogenic temperature toughness for use in constructing the pipes and other components of the present invention. Other suitable steels may exist or be developed hereafter. All such steels are within the scope of the present invention.

When a dual phase steel is used in the construction of pipe according to this invention, the dual phase steel is preferably processed in such a manner that the time period during which the steel is maintained in the intercritical temperature range for the purpose of creating the dual phase structure occurs before the accelerated cooling or quenching step. Preferably the processing is such that the dual phase structure is formed during cooling of the steel between the $Ar_3$ transformation temperature to about the $Ar_1$ transformation temperature. An additional preference for steels used in the construction of pipe according to this invention is that the steel has a tensile strength greater than 830 MPa (120 ksi) ar d a DBTT lower than about −73° C. (−100° F.) upon completion of the accelerated cooling or quenching step, i.e., without any additional processing that requires reheating of the steel such as tempering. More preferably the tensile strength of the steel upon completion of the quenching or cooling step is greater than about 860 MPa (125 ksi), and more preferably greater than about 900 MPa (130 ksi). In some applications, a steel having a tensile strength of greater than about 930 MPa (135 ksi), or greater than about 965 MPa (140 ksi), or greater than about 1000 MPa (145 ksi), upon completion of the quenching or cooling step is preferable.

Joining Methods for Construction of Pipes and Other Components

In order to construct the pipes and other components of the present invention, a suitable method of joining the steel plates is required. Any joining method that will provide seams with adequate strength and toughness for the present invention, as discussed above, is considered to be suitable. Preferably, a welding method suitable for providing adequate strength and fracture toughness to contain the fluid being contained or transported is used to construct the pipes and other components of the present invention. Such a welding method preferably includes a suitable consumable wire, a suitable consumable gas, a suitable welding process, and a suitable welding procedure. For example, both gas metal art welding (GMAW) and tungsten inert gas (TIG) welding, which are both well known in the steel fabrication industry, can be used to join the steel plates, provided that a suitable consumable wire-gas combination is used.

In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment (see Glossary) having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F. ), preferably below about −96° C. (−140° F.), more preferably below about −106° F.), and even more preferably below about −115° C. (−175° F.).

In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

A person of skill in the art has the requisite knowledge and skill to use the information provided herein to weld ultra-high strength, low alloy steel plates to produce seams having suitable high strength and fracture toughness for use in constructing the pipes and other components of the present invention. Other suitable joining or welding methods may exist or be developed hereafter. All such joining or welding methods are within the scope of the present invention.

Construction of Pipes and Other Components

Without hereby limiting this invention: pipes and other components (i) constructed from materials comprising ultra-high strength, low alloy steels containing less than 9 wt % nickel and (ii) having adequate strength and cryogenic temperature fracture toughness to contain cryogenic temperature fluids, particularly PLNG, are provided; further, pipes and other components constructed from materials comprising ultra-high strength, low alloy steels containing less than 9 wt % nickel and having a tensile strength greater than 830 MPa (120ksi) and a DBTT lower than about −73° C. (−100° F.), are provided; further, pipes and other components (i) constructed from materials comprising ultra-high strength, low alloy steels containing less than about 3 wt % nickel and (ii) having adequate strength and cryogenic temperature fracture toughness to contain cryogenic temperature fluids, particularly PLNG, are provided; and further, pipes and other components, (i) constructed from materials comprising ultra-high strength, low alloy steels containing less than about 3 wt % nickel and (ii) having tensile strengths exceeding about 1000 MPa (145 ksi) and DBTTs lower than about −73° C. (−100° F.), are provided. Such pipes and other components are preferably constructed from the ultra-high strength, low alloy steels with excellent cryogenic temperature toughness described herein.

The pipes and other components of his invention are preferably constructed from discrete plates of ultra-high strength, low alloy steel with excellent cryogenic temperature toughness. Where applicable, the seams of the pipes, and other components as applicable, preferably have about the same strength and toughness as the ultra-high strength, low alloy steel plates. In some cases, an undermatching of the strength on the order of about 5% to about 10% may be justified for locations of lower stress. Seams with the preferred properties can be made by any suitable joining technique. Exemplary joining techniques described herein, under the subheading "Joining Methods for Construction of Pipes and Other Components".

As will be familiar to those skilled in the art, the Charpy V-notch (CVN) test can be used for the purpose of fracture toughness assessment and fracture control in the design of pipes for transporting pressurized, cryogenic temperature fluids, such as PLNG, particularly through use of the ductile-to-brittle transition temperature (DBTT). The DBTT delineates two fracture regimes in structural steels. At temperatures below the DBTT, failure in the Charpy V-notch test tends to occur by low energy cleavage (brittle) fracture, which at temperatures above the DBTT, failure tends to occur by high energy ductile fracture. Pipes that are constructed from welded steels for the transportation of PLNG and for other load-bearing, cryogenic temperature service must have DBTTs, as determined by the Charpy V-notch test, well below the service temperature of the structure in order to avoid brittle failure. Depending on the design, the service conditions, and/or the requirements of the applicable classification society, the required DBTT temperature shift may be from 5° C. to 30° C. (9° F. to 54° F.) below the service temperature.

As will be familiar to those skilled in the art, the operating conditions taken into consideration in the design of pipe constructed from a welded steel for transporting pressurized, cryogenic fluids, such as PLNG, include among other things, the operating pressure and temperature, as well as additional stresses that are likely to be imposed on the steel and the weldments (see Glossary). Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "PD 6493:1991", may be used to determine the maximum allowable flaw sizes for the pipe based on the fracture toughness of the steel and weldment (including HAZ) and ti e imposed stresses on the pipe. A person skilled in the art can develop a fracture control program to mitigate fracture initiation through (i) appropriate pipe design to minimize imposed stresses, (ii) appropriate manufacturing quality control to minimize defects, (iii) appropriate control of life cycle loads and pressures applied to the pipe, and (iv) an appropriate inspection program to reliably detect flaws and defects in the pipe. A preferred design philosophy for the system of the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a pipe according to this invention.

Figure 2A:
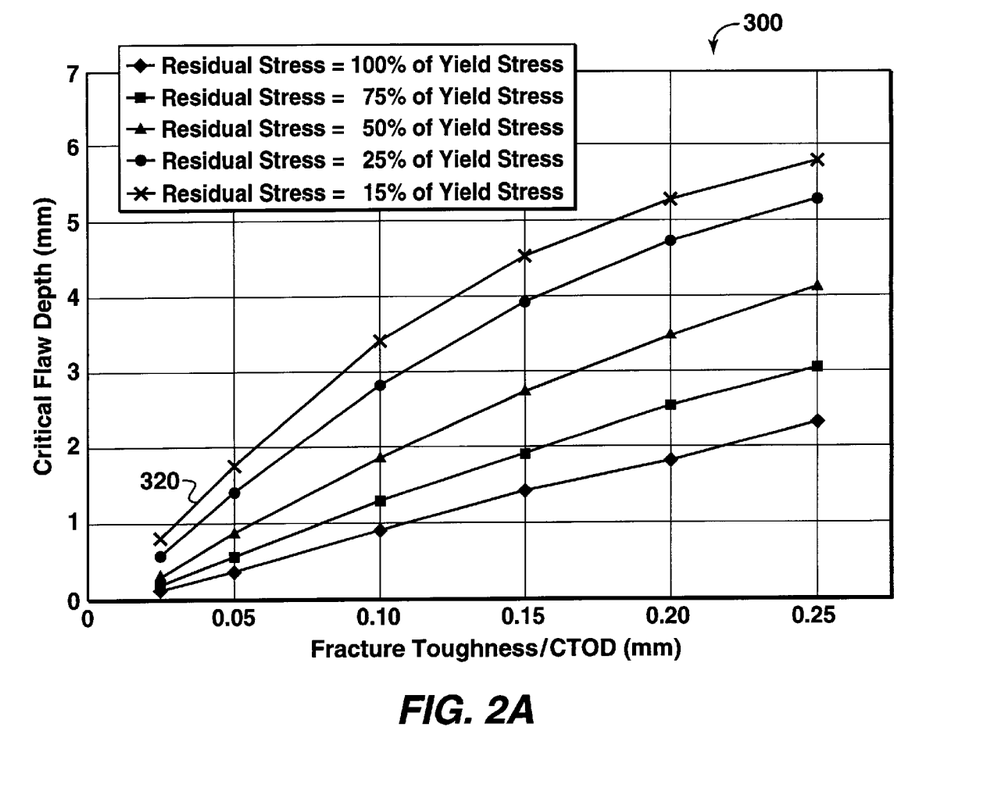
FIG. 2A illustrates a plot of critical law depth, for a given flaw length, as a function of CTOD fracture toughness and of residual stress.
Figure 2B:
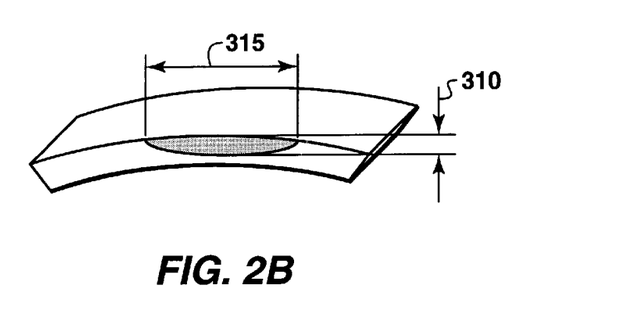
FIG. 2B illustrates the geometry (length and depth) of a flaw.

FIG. 2B illustrates a flaw of flaw length 315 and flaw depth 310. PD6493 is used to calculate values for the critical flails size plot 300 shown in FIG. 2A based on the following design conditions for a pipe:

Pipe Diameter: 914 mm (36 in)
Pipe Wall Thickness: 20 mm (0.787 in.)
Operating Axial Stress: 0.80 (multiplied by) SMYS=662 MPa (96 ksi)

For the purpose of this example, a surface flaw length of 100 mm (4 inches), e.g., a circumferential flaw located in a girth weld, is assumed. Referring now to FIG. 2A, plot 300 shows the value for critical flaw depth as a function of CTOD fracture toughness and of residual stress, for residual stress levels of 15, 25, 50, 75 and 100 percent of yield stress. Residual stresses can be generated due to fabrication and welding; and PD6493 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the steel at the minimum service temperature, the pipe welding procedures can be adjusted to reduce the residual stresses and an inspection program can be implemented (for both initial inspection and in-service inspection) to detect and measure flaws for comparison against critical flaw size. In this example, if the steel has a CTOD toughness of 0.030 mm at the minimum service temperature (as measured using laboratory specimens) and the residual stresses are reduced to 15 percent of the steel yield strength, then the value for critical flaw depth is approximately 1 mm (see point 320 on FIG. 2A). Following similar calculation procedures, as are wellkown to those skilled in the art, critical flaw depths can be determined for various law lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.030 mm CTOD toughness generally correlates to a CVN value of about 44 J. This example is not intended to limit this invention in any way.

For pipes and other components that require bending of the steel, e.g., into a cylindrical shape for a container or into a tubular shape for a pipe, the steel is preferably bent into the desired shape at ambient temperature in order to avoid detrimentally affecting the excellent cryogenic temperature toughness of the steel. If the steel must be heated to achieve the desired shape after bending, the steel is preferably heated to a temperature no higher than about 600° C. (1112° F.) in order to preserve the beneficial effects of the steel microstructure as described above.

The unique advantages associated with such pipes and other components are described in detail below.

Pipeline Distribution Network Systems

Figure 1:
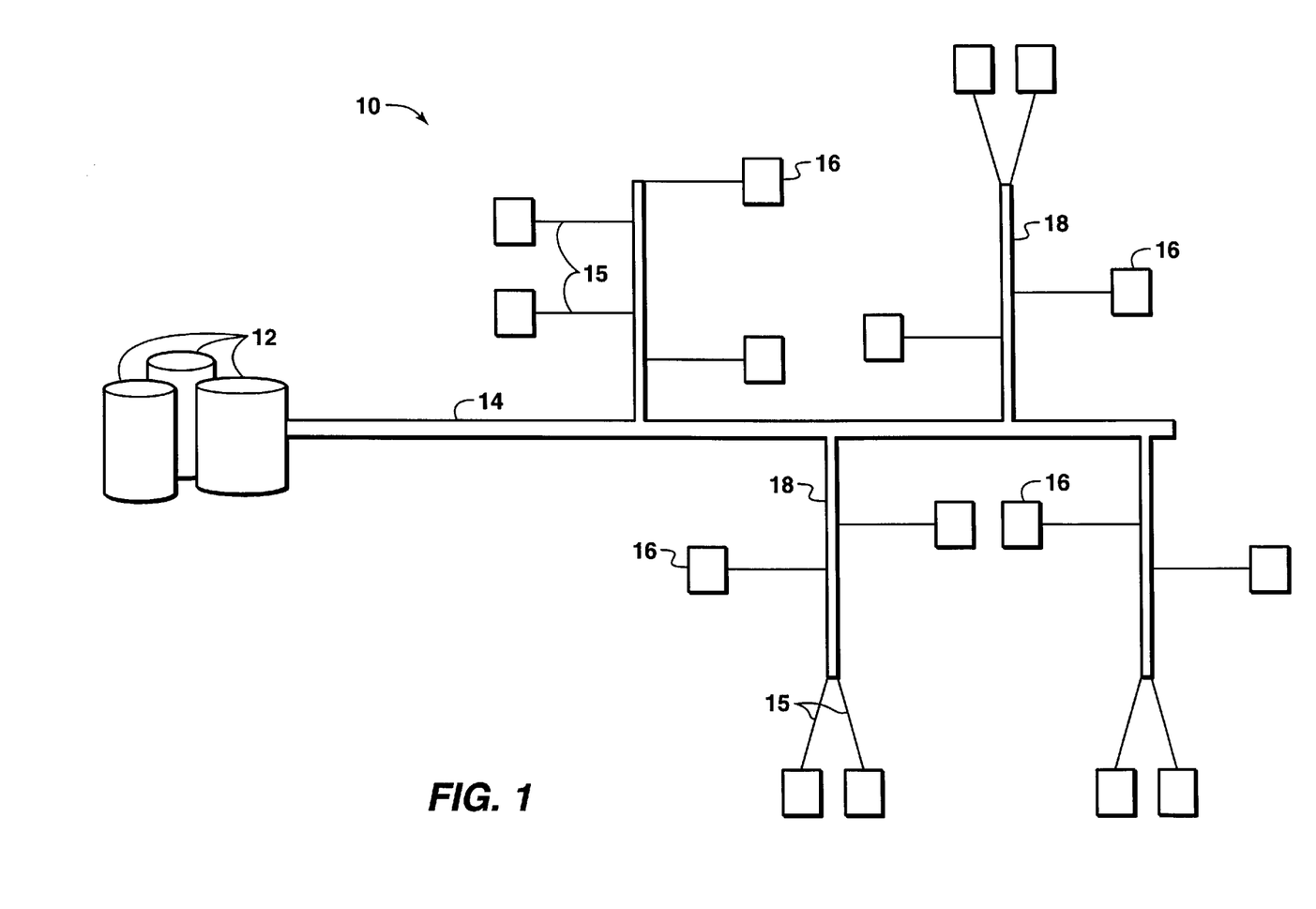
FIG. 1 schematically illustrates a pipeline distribution network system of the present invention.

Referring to FIG. 1, a pipeline distribution network system 10 according to the present invention for distribution of PLNG preferably includes at least one storage container 12, at least one primary distribution pipe 14, and at least one destination site 16. Destination site 16 may be, for purposes of example only without thereby limiting this invention, a vehicle refueling station, a manufacturing plant, or an LNG vaporization site on a natural gas pipeline. The pipeline distribution network system illustrated in FIG. 1 also has at least one secondary distribution pipe 18, and at least one tertiary distribution pipe 15.

Pipeline distribution network system 10 is preferably designed to control heat leak into the system, in order to control the vaporization of PLNG. Heat leak may be controlled by means known to those skilled in the art, such as by appropriate insulation and thicknesses of insulation surrounding the pipes, such as primary distribution pipe 14, and surrounding the storage container 12. Additionally, vapor handling facilities (not shown in FIG. 1) including a reliquefier may be included in pipeline distribution network system 10, or excess vapor can be used to fuel gas-powered equipment.

PLNG is preferably pumped by a cryogenic pump (not shown in FIG. 1). Additionally, cryogenic pumps are preferably used at various locations throughout pipeline distribution network system 10 to maintain the pressure, and thus also the temperature, of PLNG being pumped through the system within desired ranges. Appropriate cryogenic pumps may be selected by those skilled in the art. Preferably, a check valve (not shown in FIG. 1) between destination site 16 and piping in the system, e.g., secondary distribution pipe 18, prevents reverse flow from destination site 16 back into the piping. An advantage of the pipeline distribution network systems of this invention is that the PLNG (a liquid) can be pumped to destination sites, thereby avoiding the incremental cos of compression associated with typical natural gas distribution systems.

A typical receiving terminal for PLNG is located on the coast for receiving PLNG from a PLNG tanker ship. The terminal preferably has at least one PLNG storage container 12 and facilities (not shown in FIG. 1) for vaporizing the PLNG. A pipeline distribution network system 10 for a typical metropolitan network with 100 PLNG users/distributors each requiring about 3,000 gallons of PLNG a day, for example, includes a 10" primary distribution pipe 14, about ten 3" secondary distribution pipes 18, and about one hundred 1.5" tertiary distribution pipes 15.

Pipes and other components of the above-described pipeline distribution network systems for distribution of PLNG are preferably constructed from any suitable ultra-high strength, low alloy steel as described herein, such as any of the steels described above under the sub-heading "Steel for Construction of Pipes and Other Components". The pipes and other Components are sized according to the needs of the PLNG project in which the pipeline distribution network system will be utilized. In addition to the information provided in this specification, a person skilled in the art may use standard engineering practices and references available in the industry to determine the necessary dimensions, wall thickness, etc. for the pipes and other components and to construct and operate the pipeline distribution network systems of this invention.

The systems of this invention are advantageously used for distributing/transporting PLNG. Additionally, the systems of this invention are advantageously used (i) for distributing/transporting other pressurized, cryogenic fluids, (ii) for distributing/transporting pressurized, non-cryogenic fluids, or (iii) for distributing/transporting cryogenic fluids at atmospheric pressure.

While the foregoing invention has been described in terms of one or more preferred embodiments, it should be understood that other modifications may be made without departing from the scope of the invention, which is set forth in the following claims.

Glossary of Terms $Ac_1$ transformation temperature: the temperature at which austenite begins to form during heating;

$Ac_3$ transformation temperature: the temperature at which transformation of ferrite to austenite is completed during heating;

$Ar_1$ transformation temperature: the temperature at which transformation of austenite to ferrite or to ferrite plus cementite is completed during cooling;

$Ar_3$ transformation temperature: the temperature at which austenite begins to transform to ferrite during cooling;

cryogenic temperatures: temperatures lower than about −40° C. (−40° F.);

CTOD: crack tip opening displacement;

CVN: Charpy-V-notch;

DBTT (Ductile to Brittle Transition Temperature): delinates the two fracture regimes in structural steel; at temperatures below the DBTT, failure tends to occur by low energy cleavage (brittle) fracture, while at temperatures above the DBTT, failure tends to occur by high energy ductile fracture;

essentially: substantially 100 vol %;

$Gm^3$: billion cubic meters;

GMAW: gas metal arc welding;

hardening particles: one or more of ε-copper, $Mo_2C$, or the carbides and carbonitrides of niobium and vanadium;

HAZ: heat affected zone;

intercritical temperature range: from about the $Ac_1$ transformation temperature to about the $Ac_3$ transformation temperature on heating, and from about the $Ar_3$ transformation temperature to about the $Arl_1$ transformation temperature on cooling;

$K_{IC}$: critical stress intensity factor;

kJ: kilojoule;

kPa: thousands of Pascals;

ksi: thousand of pounds per square inch;

low alloy steel: a steel containing iron and less than about 10 wt % total alloy additives;

MA: martensite-austenite;

maximum allowable flaw size: critical flaw length and depth;

$Mo_2C$: a form of molybdenum carbide;

MPa: millions of Pascals;

$M_s$ transformation temperature: the temperature at which transformation of austenite to martensite starts during cooling;

PLNG: pressurized liquefied natural gas;

predominantly: at least about 50 volume percent;

ppm: parts-per-million;

psia: pounds per square inch absolute;

quenching: accelerated cooling by any means whereby a fluid selected for its tendency to increase the cooling rate of the steel is utilized, as opposed to air cooling;

quenching (cooling) rate: cooling rate at the center, or substantially at the center, of the plate thickness;

Quench Stop Temperature: the highest, or substantially the highest, temperature reached at the surface of the plate, after quenching is stopped, because of heat transmitted from the mid-thickness of the plate;

QST: Quench Stop Temperature;

slab: a piece of steel having any dimensions;

TCF: trillion cubic feet;

tensile strength: in tensile testing, the ratio of maximum load to original cross-sectional area;

TIG welding: tungsten inert gas welding;

$T_{nr}$ temperature: the temperature below which austenite does not recrystallize;

USPTO: United States Patent and Trademark Office; and weldment: a welded joint or seam, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments.

What we claim is:

1. A method of transporting a pressurized liquefied natural gas from a storage site to destination site, said method comprising the steps of:

(a) delivering said pressurized liquefied natural gas, having a pressure of about 1035 kPa (150 psia) to about 7590 kPa (1100 psia) and a temperature of about −123° C. (−190° F.) to about −62° C. (−80° F.), to an inlet of a pipeline distribution network system at said storage site, wherein said pipeline distribution network system has at least one pipe that has been constructed by bending at least one discrete plate of a material comprising an ultra-high strength, low alloy steel containing less than 9 wt % nickel and having a tensile strength greater than 830 MPa (120 ksi) and a ductile-to-brittle transition temperature lower than about −73° C. (−100° F.) so that first and second edges of said discrete plate become juxtaposed in such a way that said first and second edges can be joined, and joining together thus juxtaposed first and second edges of said discrete plate, wherein any seam formed by said joining has adequate strength and toughness at said pressure and temperature conditions to contain said pressurized liquefied natural gas; and (b) pumping said pressurized liquefied natural gas to an outlet of said pipeline distribution network system at said destination site.

2. The method of claim 1, wherein vaporizing equipment for converting said pressurized liquefied natural gas to a gas and delivering said gas to users or distributors is connected to said outlet of said outlet of said pipeline distribution network system.

3. The method of claim 2 further comprising the step of:

(c) delivering said gas to a gas pipeline.

4. The method of claim 1, wherein said pipeline distribution network system has at least one storage container, wherein said storage container has been constructed by joining together a plurality of discrete plates of materials comprising an ultra-high strength, low alloy steel containing less than 9 wt % nickel and having a tensile strength greater than 830 MPa (120 ksi) and a ductile-to-brittle transition temperature lower than about −73° C. (−100° F.), and wherein joints between said discrete plates have adequate strength and toughness at said pressure and temperature conditions to contain said pressurized liquefied natural gas.

* * * * *